Feb. 14, 1961  V. F. DE VOST  2,971,497
HIGH CAPACITY RELEASE MECHANISM
Filed Oct. 6, 1959  2 Sheets-Sheet 1

INVENTOR.
V. F. DEVOST
BY
ATTORNEYS.

Feb. 14, 1961 V. F. DE VOST 2,971,497
HIGH CAPACITY RELEASE MECHANISM
Filed Oct. 6, 1959 2 Sheets-Sheet 2
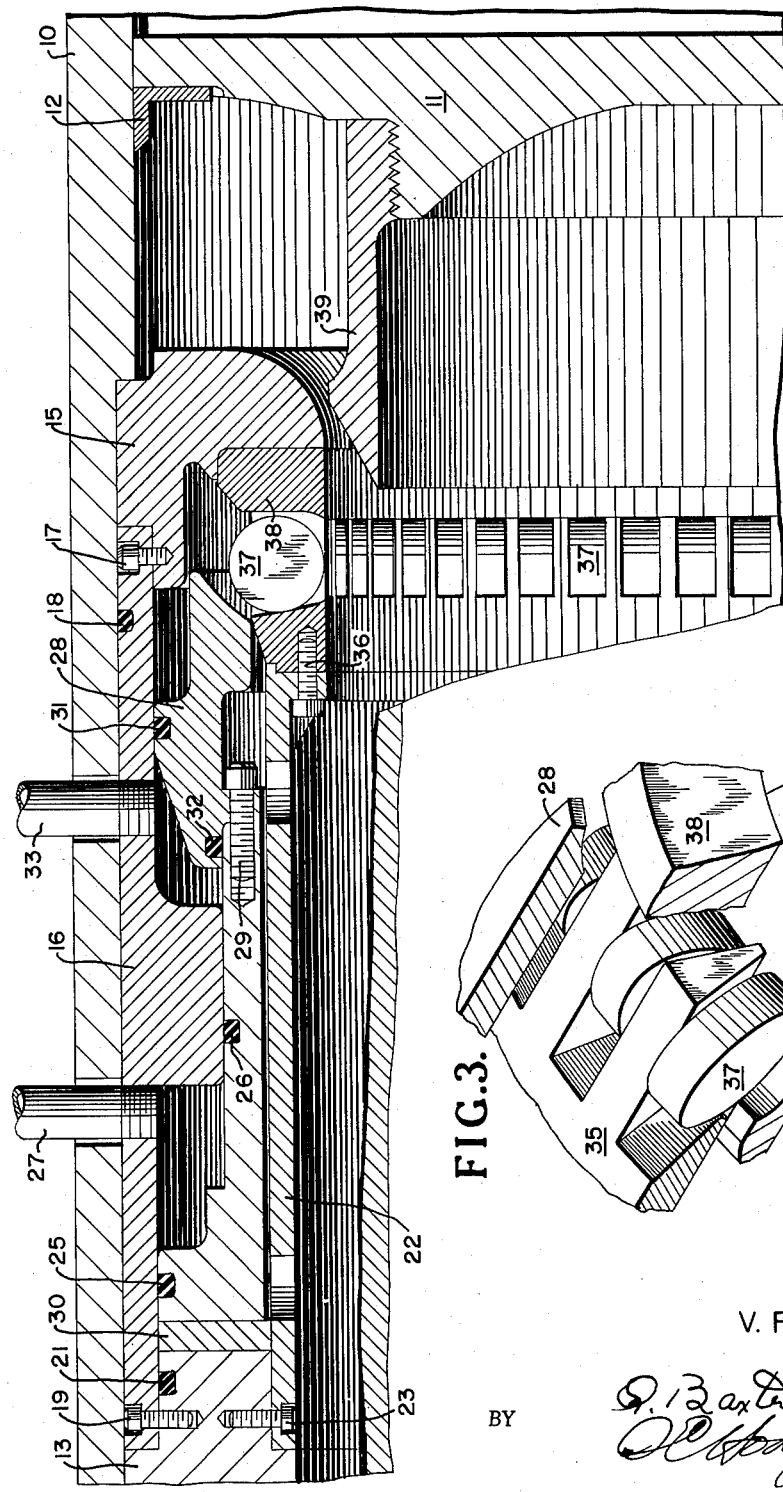
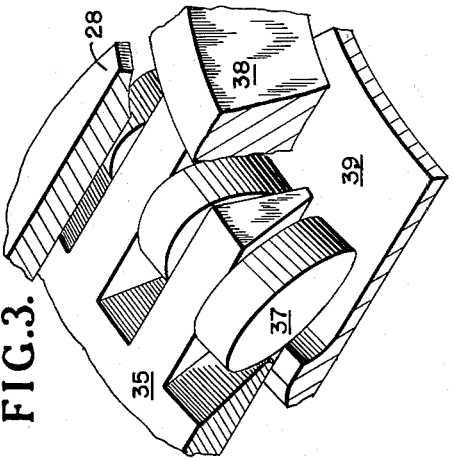
INVENTOR,
V. F. DEVOST
BY
ATTORNEYS.

United States Patent Office 2,971,497
Patented Feb. 14, 1961

2,971,497

HIGH CAPACITY RELEASE MECHANISM

Valmore F. De Vost, Silver Spring, Md., assignor to the United States of America as represented by the Secretary of the Navy Filed Oct. 6, 1959, Ser. No. 844,836

3 Claims. (Cl. 121—40)

(Granted under Title 35, U.S. Code (1952), sec. 266)

The invention described herein may be manufactured and used by or for the Government of the United States of America for governmental purposes without the payment of any royalties thereon or therefor.

This invention relates to a release mechanism for use in shock testers and launchers wherein the mechanism holds a piston in a locked position until the pressure in a chamber behind the piston builds up to a predetermined value, whereupon it releases the piston; more specifically the invention relates to a release mechanism of the ball-chuck type in which the balls are replaced by rollers.

Ball-chuck releases have been used in the past in applications in which the pistons which they hold are subjected to relatively low pressures. Until recently, these releases met most of the requirements for the shock testing of military components, but present shock testing requires relatively high pressures which go beyond their capabilities, the concomitant high stresses causing failures in the working parts.

Explosive bolts, shear diaphragms, and tensile bars have been adapted to such present high-pressure applications, but such devices are harder to calibrate and do not display the same ease of operation and shock control as the ball-chuck type.

It is therefore an object of this invention to provide a modified ball-chuck release mechanism suitable for use under high loading.

Another object is to provide a new and improved release mechanism suitable for use in highly loaded shock testing apparatus and launchers which provides more precise control of the shock transmitted than explosive bolts, shear diaphragms, or tensile bars.

Yet another object is to provide a release mechanism suitable for use in highly loaded shock testing apparatus and launchers which is easy to calibrate.

Still another object is to provide a release mechanism suitable for use in highly loaded shock testing apparatus and launchers which displays great ease of operation and freedom from damage with use.

Other objects and advantages of the instant invention will become apparent to those skilled in the art from a reading of the following specification taken in connection with the annexed drawings of which:

Fig. 2 is an elevational view in section of the apparatus of Fig. 1 with the release mechanism in the released position; and Fig. 3 is a perspective view of a portion of the apparatus of Fig. 1 showing the release mechanism in greater detail.

Figure 1:
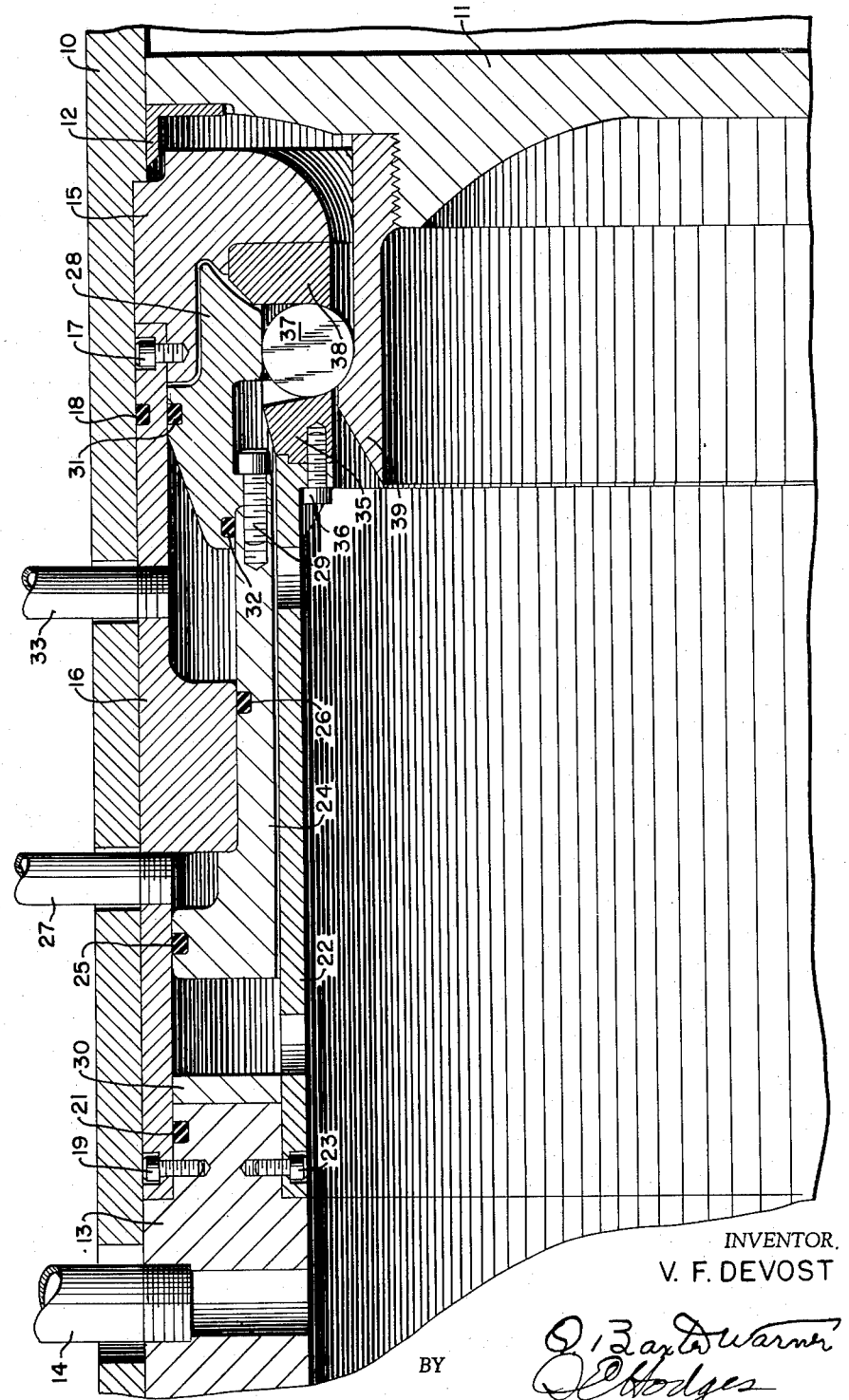
Fig. 1 is an elevational view in section of the apparatus of the instant invention with the release mechanism in the locked position.

Referring now to the drawings in which like reference numerals represent like parts throughout the several views, there is shown thereon a cylinder 10 with piston 11 positioned for slideable movement therein and sealed thereto by annular ring 12. Block 13 fits within, on the side of the piston nearest ring 12, and forms a closure for cylinder 10 so that in conjunction with cylinder 10, a compartment is formed and air inlet 14 runs through an aperture in cylinder 10 and is attached to block 13 which has an aperture communicating therefrom to the interior of the compartment.

Annular thrust ring 15 fits within the cylindrical compartment near the piston, being restrained from movement towards the piston by a shoulder on cylinder 10. Annular housing 16 fits within the cylindrical compartment, being attached at one end to thrust ring 15 by cap screws 17 with O ring 18 forming a seal between the housing and the cylinder 10. Housing 16 is attached to block 13 at its other end by cap screws 19 with O ring 21 forming a seal therebetween, and is further provided with a centrally located annular raised portion.

Annular member 22 is attached to block 13 by means of cap screws 23 and is of a smaller diameter than the housing member so that a space exists between them. Longitudinally moveably mounted upon member 22 in the existing space is annular release sleeve 24, a portion of which is raised so as to substantially contact a low portion of housing member 16 on the side of the raised portion nearest block 13 with O ring 25 forming a seal between the parts; sleeve 24 further has a low portion which substantially contacts the raised portion of housing 16 with O ring 26 forming a seal therebetween whereby a small compartment is formed between the sleeve and the housing on the side of the raised portion of the housing nearest block 13. Oil inlet 27 goes through an aperture in cylinder 10 and is attached to housing 16 so as to communicate with the compartment. Annular pad 30 is attached to block 13 between members 22 and 16 to prevent the sleeve 24 from contacting block 13 in its longitudinal movement away from the piston.

Annular release sleeve ring 28 is attached to release sleeve 24 by cap screws 29, ring 28 having a raised portion which substantially contacts the last named low portion of housing 16 with O ring 31 forming a seal therebetween. O ring 32 forms a seal between members 24 and 28, thus forming another compartment on the opposite side of the raised portion of housing 16. Air inlet 33 goes through an aperture in cylinder 12 and is attached to housing 16 so as to communicate with the latter compartment.

Disk retainer 35 is attached to member 22 by cap screws 36 and has a multiplicity of slots tapered inwardly and arranged equidistantly about its periphery at the end nearest the piston 11, said slots running longitudinally from the end of the piece towards the opposite end. Positioned on edge in the slots are disks or rollers 37, the slotted end of member 35 abutting thrust ring insert 38, confining the disks longitudinally and further restricting inward movement of the disks so that they will not go completely through the slots.

Attached at one end to piston 11 is annular member 39 which is essentially a cylinder but has a portion raised towards the disks and has a concave cylindrical curvature from the level of the raised portion to the level of the cylindrical portion towards the piston, such as to fit the contour of the disks, said member being positioned normally so as to prevent inward movement of the disks which abut it, fitting the curvature thereof, the lower level of the disks protruding below the level of the raised portion thereof. Member 39 further has a gentle slope from the raised portion to the inner diameter of the cylindrical portion on the side of the raised portion nearest block 13.

Disks 37 are constrained from outward movement by a relatively thick portion of release sleeve ring 28 which then tapers off gradually in thickness from the inner diameter to the outer in the direction of the piston.

In operation, the object to be tested is attached to the head of piston 11 which is then pushed towards block 13, the sloped portion of member 39 camming the disks upward so that the raised portion of member 39, which is attached to piston 11, goes past them. Air from inlet 33 enters the corresponding compartment, pressurizing it and forcing release sleeve ring 28 towards the piston which in turn forces the relatively thick portion of member 28 over the disks, with a slight camming action forcing them inwardly and constraining them thereafter from outward movement.

Air from inlet 14 entering the compartment between the piston and block 13 builds up pressure behind the piston. When the pressure on the piston reaches a predetermined value, air is shut off and oil is pumped rapidly through inlet 27, pressurizing the corresponding compartment. At the same time the air pressure tending to force member 28 towards the piston is removed, and member 28 begins to move away from the piston as soon as the oil pressure becomes greater than the air pressure which is rapidly decreasing.

As member 28 moves away from the piston, the relatively thick portion thereof moves from directly over the disks, and its former position is occupied by the tapered portion, thus allowing a limited amount of outward movement to the disks which are cammed outwardly by member 39. Finally the raised portion of member 39 is no longer held by disks which have moved out of its path as shown in Fig. 2, and the piston is free to move down the cylinder 10.

The materials used in the present invention are conventional except that the thrust ring insert 38, the disks 37, and the portion of member 39 which contacts the disks are surface hardened, as is that portion of member 28 which contacts the disks.

The apparatus is useful for subjecting military components to accelerative shock and to impact shock. Each pressure in the compartment behind the piston will impart a smooth acceleration with a characteristic peak to the piston and the apparatus is thus easily and precisely calibrated to give the desired shock control.

With the present apparatus, the area of contact between the thrust ring insert and the outward moving parts, the disks, and between the disks and member 39 has been increased several fold over the older ball bearing type with a proportionate reduction in pressures per unit area on the parts. Thus the parts are not as highly stressed as in the older type, for a given pressure acting on the piston, and will not break readily.

To reposition the apparatus for another test, it is only necessary to push the piston towards block 13 until it locks, which operation is far simpler than installing new explosive bolts, shear diaphragms, etc.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In shock testing and launching apparatus, a cylinder having an end portion adapted to be pressurized: a piston positioned in said cylinder so as to form a pressure chamber in conjunction with the end of the cylinder so adapted; means to high pressurize the chamber; an annular member having one end attached to the pressurized side of the piston and projecting rearwardly into the chamber, having an annular raised portion near the opposite end projecting outwardly to act as a latch, and further having an annular beveled face which slopes inwardly from the level of the raised portion and away from the piston; radially moveable catch means to catch and hold the raised portion of the annular member so that the piston is selectively constrained from axial movement while the chamber is pressurized which comprises an annular thrust ring positioned inside the pressure chamber and constrained from axial movement, an annular disk retainer positioned in the pressure chamber rearwardly of the thrust ring and constrained from axial movement, one end of the disk retainer abutting the thrust ring and having a multiplicity of open-ended longitudinal slots equidistantly spaced about its periphery, the slots being longer at the outer surface than at the inner so as to form a taper, a multiplicity of disk-like rollers, each positioned within a slot identical thereto, being of such a thickness to fit within the walls of the slot, and being of such a diameter to pass through the tapered slot from the outer surface until constrained from further inward movement by the tapered end of the slot so that no part of the roller projects outwardly from the disk retainer and so that a portion of the roller projects inwardly from the disk retainer below the level of the raised portion of the annular member attached to the piston; a sleeve closely surrounding the disk retainer, moveable longitudinally with respect thereto and having the end nearest the rollers adapted to exert a camming effect upon the rollers to force them inwardly as the sleeve moves towards the piston and having a portion of constant diameter immediately behind the cam-adapted end portion so as to hold the rollers in the position into which they were forced; and means connected to the sleeve for moving it longitudinally.

2. The apparatus of claim 1 in which the annular member having the raised portion has a cylindrical concave curvature curving inwardly and towards the piston from the level of the raised portion to the level of the body of the member and the disk-like rollers have a curvature which fits the contour of the annular member.

3. The apparatus of claim 2 in which the face of the thrust ring adjacent the rollers, the cylindrical surface of the rollers, the cylindrically curved portion of the annular member attached to the piston, and the camming surface of the sleeve are each hardened.

References Cited in the file of this patent

UNITED STATES PATENTS

| | | |
|---|---|---|
| 1,636,421 | Knott | July 19, 1927 |
| 2,393,962 | Ashton et al. | Feb. 5, 1946 |
| 2,434,828 | Ashton et al. | Jan. 20, 1948 |
| 2,491,605 | Chittenden | Dec. 20, 1949 |
| 2,632,425 | Grover | Mar. 24, 1953 |
| 2,813,518 | Driskel et al. | Nov. 19, 1957 |
| 2,923,278 | Katzberg | Feb. 2, 1960 |
| 2,926,020 | Dayton et al. | Feb. 23, 1960 |